United States Patent
Nelken et al.

(10) Patent No.: US 10,055,501 B2
(45) Date of Patent: Aug. 21, 2018

(54) WEB-BASED CUSTOMER SERVICE INTERFACE

(71) Applicant: International Business Machines Corporation, Armonk, NY (US)

(72) Inventors: Yoram Nelken, San Francisco, CA (US); Randy Jessee, Tracy, CA (US); Steve Kirshner, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 14/935,174

(22) Filed: Nov. 6, 2015

(65) Prior Publication Data

US 2016/0063126 A1    Mar. 3, 2016

Related U.S. Application Data

(63) Continuation of application No. 11/843,972, filed on Aug. 23, 2007, now abandoned, which is a (Continued)

(51) Int. Cl.
*G06F 17/30* (2006.01)

(52) U.S. Cl.
CPC .... *G06F 17/30867* (2013.01); *G06F 17/3053* (2013.01); *G06F 17/30528* (2013.01);
(Continued)

(58) Field of Classification Search
CPC .......... G06F 17/30528; G06F 17/3053; G06F 17/30598; G06F 17/30654;
(Continued)

(56) References Cited

U.S. PATENT DOCUMENTS

| | | |
|---|---|---|
| 3,648,253 A | 3/1972 | Mullery et al. |
| 4,110,823 A | 8/1978 | Cronshaw et al. |

(Continued)

FOREIGN PATENT DOCUMENTS

| | | |
|---|---|---|
| CA | 2180392 | 2/2001 |
| EP | 0 597 630 | 5/1994 |

(Continued)

OTHER PUBLICATIONS

Breese et al, "Empirical Analysis of Predictive Algorithms for Collaborative Filtering," Proc. of the 14th Conf. on Uncertainty in Artificial Intelligence, Jul. 1998.

(Continued)

*Primary Examiner* — Shew-Fen Lin
(74) *Attorney, Agent, or Firm* — Gates & Cooper LLP

(57) ABSTRACT

A system and method for processing a web-based query is provided. The system comprises a web server for transmitting a web form having a text field box for entering a natural language query, and a language analysis server for extracting concepts from the natural language query and classifying the natural language query into predefined categories via computed match scores based upon the extracted concepts and information contained within an adaptable knowledge base. In various embodiments, the web server selectively transmits either a resource page or a confirmation page to the client, based upon the match scores. The resource page may comprise at least one suggested response corresponding to at least one predefined category. The language analysis server may adapt the knowledge base in accordance with a communicative action received from the client after the resource page is transmitted.

16 Claims, 6 Drawing Sheets

Related U.S. Application Data continuation of application No. 10/839,930, filed on May 5, 2004, now abandoned.

(60) Provisional application No. 60/468,576, filed on May 6, 2003.

(52) U.S. Cl.
CPC .. *G06F 17/30598* (2013.01); *G06F 17/30654* (2013.01); *G06F 17/30684* (2013.01); *G06F 17/30864* (2013.01); *G06F 17/30882* (2013.01)

(58) Field of Classification Search
CPC ......... G06F 17/30684; G06F 17/30864; G06F 17/30867; G06F 17/30882
See application file for complete search history.

(56) References Cited

U.S. PATENT DOCUMENTS

| | | |
|---|---|---|
| 4,286,322 A | 8/1981 | Hoffman et al. |
| 4,586,160 A | 4/1986 | Amano et al. |
| 4,642,756 A | 2/1987 | Sherrod |
| 4,658,370 A | 4/1987 | Erman et al. |
| 4,724,523 A | 2/1988 | Kucera |
| 4,805,107 A | 2/1989 | Kieckhafer et al. |
| 4,814,974 A | 3/1989 | Narayanan et al. |
| 4,908,865 A | 3/1990 | Doddington et al. |
| 4,918,735 A | 4/1990 | Morito et al. |
| 4,942,527 A | 7/1990 | Schumacher |
| 4,984,178 A | 1/1991 | Hemphill et al. |
| 5,018,215 A | 5/1991 | Nasr et al. |
| 5,023,832 A | 6/1991 | Fulcher et al. |
| 5,040,141 A | 8/1991 | Yazima et al. |
| 5,051,924 A | 9/1991 | Bergeron et al. |
| 5,060,155 A | 10/1991 | Van Zuijlen |
| 5,067,099 A | 11/1991 | McCown et al. |
| 5,068,789 A | 11/1991 | van Vliembergen |
| 5,099,425 A | 3/1992 | Kanno et al. |
| 5,101,349 A | 3/1992 | Tokuume et al. |
| 5,111,398 A | 5/1992 | Nunberg et al. |
| 5,125,024 A | 6/1992 | Gokcen et al. |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,129 A | 10/1993 | Jacobs |
| 5,251,131 A | 10/1993 | Masand et al. |
| 5,265,033 A | 11/1993 | Vajk et al. |
| 5,278,942 A | 1/1994 | Bahl et al. |
| 5,287,430 A | 2/1994 | Iwamoto |
| 5,311,583 A | 5/1994 | Friedes et al. |
| 5,321,608 A | 6/1994 | Namba et al. |
| 5,325,298 A | 6/1994 | Gallant |
| 5,325,526 A | 6/1994 | Cameron et al. |
| 5,345,501 A | 9/1994 | Shelton |
| 5,349,526 A | 9/1994 | Potts et al. |
| 5,365,430 A | 11/1994 | Jagadish |
| 5,369,570 A | 11/1994 | Parad |
| 5,369,577 A | 11/1994 | Kadashevich et al. |
| 5,371,807 A | 12/1994 | Register et al. |
| 5,377,354 A | 12/1994 | Scannell et al. |
| 5,418,717 A | 5/1995 | Su et al. |
| 5,418,948 A | 5/1995 | Turtle |
| 5,437,032 A | 7/1995 | Wolf et al. |
| 5,444,820 A | 8/1995 | Tzes et al. |
| 5,475,588 A | 12/1995 | Schabes et al. |
| 5,483,466 A | 1/1996 | Kawahara et al. |
| 5,487,100 A | 1/1996 | Kane |
| 5,493,677 A | 2/1996 | Balogh et al. |
| 5,493,692 A | 2/1996 | Theimer et al. |
| 5,506,787 A | 4/1996 | Muhlfeld et al. |
| 5,526,521 A | 6/1996 | Fitch et al. |
| 5,542,088 A | 7/1996 | Jennings, Jr. et al. |
| 5,555,344 A | 9/1996 | Zunkler |
| 5,559,710 A | 9/1996 | Shahraray et al. |
| 5,577,241 A | 11/1996 | Spencer |
| 5,590,055 A | 12/1996 | Chapman et al. |
| 5,594,641 A | 1/1997 | Kaplan et al. |
| 5,596,502 A | 1/1997 | Koski et al. |
| 5,610,812 A | 3/1997 | Scabes et al. |
| 5,615,360 A | 3/1997 | Bezek et al. |
| 5,627,914 A | 5/1997 | Pagallo |
| 5,630,128 A | 5/1997 | Farrell et al. |
| 5,634,053 A | 5/1997 | Noble et al. |
| 5,634,121 A | 5/1997 | Tracz et al. |
| 5,636,124 A | 6/1997 | Rischar et al. |
| 5,649,215 A | 7/1997 | Itoh |
| 5,664,061 A | 9/1997 | Andreshak et al. |
| 5,680,628 A | 10/1997 | Carus |
| 5,687,384 A | 11/1997 | Nagase |
| 5,694,616 A | 12/1997 | Johnson et al. |
| 5,701,400 A | 12/1997 | Amado |
| 5,708,829 A | 1/1998 | Kadashevich |
| 5,715,371 A | 2/1998 | Ahamed et al. |
| 5,721,770 A | 2/1998 | Kohler |
| 5,721,897 A | 2/1998 | Rubinstein |
| 5,724,481 A | 3/1998 | Garberg et al. |
| 5,737,621 A | 4/1998 | Kaplan et al. |
| 5,737,734 A | 4/1998 | Schultz |
| 5,745,652 A | 4/1998 | Bigus |
| 5,745,736 A | 4/1998 | Picart |
| 5,748,973 A | 5/1998 | Palmer et al. |
| 5,754,671 A | 5/1998 | Higgins et al. |
| 5,761,631 A | 6/1998 | Nasukawa |
| 5,765,033 A | 6/1998 | Miloslavsky |
| 5,768,578 A | 6/1998 | Kirk et al. |
| 5,794,194 A | 8/1998 | Takebayashi et al. |
| 5,799,268 A | 8/1998 | Boguraev |
| 5,806,040 A | 9/1998 | Vensko |
| 5,809,462 A | 9/1998 | Nussbaum |
| 5,809,464 A | 9/1998 | Kopp et al. |
| 5,822,731 A | 10/1998 | Schultz |
| 5,822,745 A | 10/1998 | Hekmatpour |
| 5,826,076 A | 10/1998 | Bradley et al. |
| 5,832,220 A | 11/1998 | Johnson et al. |
| 5,835,682 A | 11/1998 | Broomhead et al. |
| 5,845,246 A | 12/1998 | Schalk |
| 5,850,219 A | 12/1998 | Kumomura |
| 5,860,059 A | 1/1999 | Aust et al. |
| 5,864,848 A | 1/1999 | Horvitz et al. |
| 5,864,863 A | 1/1999 | Burrows |
| 5,867,495 A | 2/1999 | Elliott et al. |
| 5,878,385 A | 3/1999 | Bralich et al. |
| 5,878,386 A | 3/1999 | Coughlin |
| 5,884,032 A | 3/1999 | Bateman et al. |
| 5,884,302 A | 3/1999 | Ho |
| 5,890,142 A | 3/1999 | Tanimura et al. |
| 5,890,147 A | 3/1999 | Peltonen et al. |
| 5,895,447 A | 4/1999 | Ittycheriah et al. |
| 5,899,971 A | 5/1999 | De Vos |
| 5,913,215 A | 6/1999 | Rubenstein et al. |
| 5,920,835 A | 7/1999 | Huzenlaub et al. |
| 5,933,822 A | 8/1999 | Braden-Harder et al. |
| 5,940,612 A | 8/1999 | Brady et al. |
| 5,940,821 A | 8/1999 | Wical |
| 5,944,778 A | 8/1999 | Takeuchi et al. |
| 5,946,388 A | 8/1999 | Walker et al. |
| 5,948,058 A | 9/1999 | Kudoh et al. |
| 5,950,184 A | 9/1999 | Kartutunen |
| 5,950,192 A | 9/1999 | Moore et al. |
| 5,956,711 A | 9/1999 | Sullivan et al. |
| 5,960,393 A | 9/1999 | Cohrs et al. |
| 5,963,447 A | 10/1999 | Kohn et al. |
| 5,963,894 A | 10/1999 | Riachardson et al. |
| 5,970,449 A | 10/1999 | Alleva et al. |
| 5,974,385 A | 10/1999 | Ponting et al. |
| 5,974,465 A | 10/1999 | Wong |
| 5,983,216 A | 11/1999 | Kirach |
| 5,991,713 A | 11/1999 | Unger et al. |
| 5,991,751 A | 11/1999 | Rivette et al. |
| 5,991,756 A | 11/1999 | Wu |
| 5,995,513 A | 11/1999 | Harrand et al. |

(56) References Cited

U.S. PATENT DOCUMENTS

| | | |
|---|---|---|
| 5,999,932 A | 12/1999 | Paul |
| 5,999,990 A | 12/1999 | Sharrit et al. |
| 6,006,221 A | 12/1999 | Liddy et al. |
| 6,009,422 A | 12/1999 | Ciccarelli |
| 6,012,053 A | 1/2000 | Pant et al. |
| 6,018,735 A | 1/2000 | Hunter |
| 6,021,403 A | 2/2000 | Horvitz et al. |
| 6,025,843 A | 2/2000 | Sklar |
| 6,026,388 A | 2/2000 | Liddy et al. |
| 6,032,111 A | 2/2000 | Mohri et al. |
| 6,035,104 A | 3/2000 | Zahariev |
| 6,038,535 A | 3/2000 | Campbell |
| 6,038,560 A | 3/2000 | Wical |
| 6,055,528 A | 4/2000 | Evans |
| 6,051,709 A | 5/2000 | Bronte |
| 6,058,365 A | 5/2000 | Nagal et al. |
| 6,058,389 A | 5/2000 | Chandra et al. |
| 6,064,953 A | 5/2000 | Maxwell, III et al. |
| 6,064,971 A | 5/2000 | Hartnett |
| 6,064,977 A | 5/2000 | Haverstock et al. |
| 6,067,565 A | 5/2000 | Horvitz |
| 6,070,149 A | 5/2000 | Tavor et al. |
| 6,070,158 A | 5/2000 | Kirsch et al. |
| 6,073,101 A | 6/2000 | Maes |
| 6,076,088 A | 6/2000 | Paik et al. |
| 6,081,774 A | 6/2000 | de Hita et al. |
| 6,085,159 A | 7/2000 | Ortega et al. |
| 6,092,042 A | 7/2000 | Iso |
| 6,092,095 A | 7/2000 | Maytal |
| 6,094,652 A | 7/2000 | Falsal |
| 6,073,098 A | 8/2000 | Buchsbaum et al. |
| 6,098,047 A | 8/2000 | Oku et al. |
| 6,101,537 A | 8/2000 | Edelstein et al. |
| 6,112,126 A | 8/2000 | Hales et al. |
| 6,115,734 A | 9/2000 | Mansion |
| 6,138,128 A | 10/2000 | Perkowitz et al. |
| 6,138,139 A | 10/2000 | Beck et al. |
| 6,144,940 A | 11/2000 | Nishi et al. |
| 6,148,322 A | 11/2000 | Sand et al. |
| 6,151,538 A | 11/2000 | Bate et al. |
| 6,154,720 A | 11/2000 | Onishi et al. |
| 6,161,094 A | 12/2000 | Adcock et al. |
| 6,161,130 A | 12/2000 | Horvitz et al. |
| 6,163,787 A | 12/2000 | Tang et al. |
| 6,167,370 A | 12/2000 | Tsourikov et al. |
| 6,169,986 B1 | 1/2001 | Bowman et al. |
| 6,182,029 B1 | 1/2001 | Friedman |
| 6,182,036 B1 | 1/2001 | Poppert |
| 6,182,059 B1 | 1/2001 | Angotti et al. |
| 6,182,063 B1 | 1/2001 | Woods |
| 6,182,065 B1 | 1/2001 | Yeomans |
| 6,182,120 B1 | 1/2001 | Beaulieu et al. |
| 6,185,603 B1 | 2/2001 | Henderson et al. |
| 6,199,103 B1 | 3/2001 | Sakaguchi et al. |
| 6,212,544 B1 | 4/2001 | Borkenhagen et al. |
| 6,223,201 B1 | 4/2001 | Reznak |
| 6,226,630 B1 | 5/2001 | Billmers |
| 6,233,575 B1 | 5/2001 | Agrawal et al. |
| 6,233,578 B1 | 5/2001 | Machihara et al. |
| 6,236,987 B1 | 5/2001 | Horowitz et al. |
| 6,243,735 B1 | 6/2001 | Imanishi et al. |
| 6,249,606 B1 | 6/2001 | Kiraly et al. |
| 6,256,773 B1 | 7/2001 | Bowman-Amuah |
| 6,260,068 B1 | 7/2001 | Hoenninger et al. |
| 6,263,335 B1 | 7/2001 | Paik et al. |
| 6,266,631 B1 | 7/2001 | Malcolm |
| 6,269,368 B1 | 7/2001 | Diamond |
| 6,243,679 B1 | 8/2001 | Mohri et al. |
| 6,271,840 B1 | 8/2001 | Finseth et al. |
| 6,275,819 B1 | 8/2001 | Carter |
| 6,278,973 B1 | 8/2001 | Chung et al. |
| 6,282,565 B1 | 8/2001 | Shaw et al. |
| 6,292,794 B1 | 9/2001 | Cecchini et al. |
| 6,292,938 B1 | 9/2001 | Sarkar et al. |
| 6,298,324 B1 | 10/2001 | Zuberec et al. |
| 6,301,602 B1 | 10/2001 | Ueki |
| 6,304,864 B1 | 10/2001 | Liddy et al. |
| 6,304,872 B1 | 10/2001 | Chao |
| 6,308,197 B1 | 10/2001 | Mason et al. |
| 6,311,194 B1 | 10/2001 | Sheth et al. |
| 6,314,439 B1 | 11/2001 | Bates et al. |
| 6,314,446 B1 | 11/2001 | Stiles |
| 6,324,534 B1 | 11/2001 | Neal et al. |
| 6,327,581 B1 | 12/2001 | Platt |
| 6,349,295 B1 | 2/2002 | Tedesco et al. |
| 6,353,667 B1 | 3/2002 | Foster et al. |
| 6,353,827 B1 | 3/2002 | Davies et al. |
| 6,360,243 B1 | 3/2002 | Lindsley et al. |
| 6,363,373 B1 | 3/2002 | Steinkraus |
| 6,363,377 B1 | 3/2002 | Kravets et al. |
| 6,366,910 B1 | 4/2002 | Rajaraman et al. |
| 6,370,526 B1 | 4/2002 | Agrawal et al. |
| 6,374,221 B1 | 4/2002 | Haimi-Cohen |
| 6,377,945 B1 | 4/2002 | Rievik |
| 6,377,949 B1 | 4/2002 | Gilmour |
| 6,393,415 B1 | 5/2002 | Getchius et al. |
| 6,397,209 B1 | 5/2002 | Read et al. |
| 6,397,212 B1 | 5/2002 | Biffar |
| 6,401,084 B1 | 6/2002 | Ortega et al. |
| 6,408,277 B1 | 6/2002 | Nelken |
| 6,411,947 B1 | 6/2002 | Rice et al. |
| 6,411,982 B2 | 6/2002 | Williams |
| 6,415,250 B1 | 7/2002 | van den Akkar |
| 6,418,458 B1 | 7/2002 | Maresco |
| 6,421,066 B1 | 7/2002 | Silvan |
| 6,421,675 B1 | 7/2002 | Ryan et al. |
| 6,424,995 B1 | 7/2002 | Shuman |
| 6,424,997 B1 | 7/2002 | Buskirk, Jr. et al. |
| 6,430,615 B1 | 8/2002 | Hellerstein et al. |
| 6,434,435 B1 | 8/2002 | Tubel et al. |
| 6,434,554 B1 | 8/2002 | Asami et al. |
| 6,434,556 B1 | 8/2002 | Levin et al. |
| 6,438,540 B2 | 8/2002 | Nasr et al. |
| 6,438,575 B1 | 8/2002 | Khan et al. |
| 6,442,542 B1 | 8/2002 | Ramani et al. |
| 6,442,589 B1 | 8/2002 | Takahashi et al. |
| 6,446,061 B1 | 9/2002 | Doerre et al. |
| 6,446,081 B1 | 9/2002 | Preston |
| 6,446,256 B1 | 9/2002 | Hyman et al. |
| 6,449,589 B1 | 9/2002 | Moore |
| 6,449,646 B1 | 9/2002 | Sikora et al. |
| 6,460,074 B1 | 10/2002 | Fishkin |
| 6,463,533 B1 | 10/2002 | Calamera et al. |
| 6,466,940 B1 | 10/2002 | Mills |
| 6,477,500 B2 | 11/2002 | Maes |
| 6,477,580 B1 | 11/2002 | Bowman-Amuah |
| 6,480,843 B2 | 11/2002 | Li |
| 6,490,572 B2 | 12/2002 | Akkiraju et al. |
| 6,493,447 B1 | 12/2002 | Goss et al. |
| 6,493,694 B1 | 12/2002 | Xu et al. |
| 6,496,836 B1 | 12/2002 | Ronchi |
| 6,496,853 B1 | 12/2002 | Klein |
| 6,505,158 B1 | 1/2003 | Conkie |
| 6,513,026 B1 | 1/2003 | Horvitz et al. |
| 6,535,795 B1 | 3/2003 | Schroeder et al. |
| 6,542,889 B1 | 4/2003 | Aggarwal et al. |
| 6,560,330 B2 | 5/2003 | Gabriel |
| 6,560,590 B1 | 5/2003 | Shwe et al. |
| 6,571,282 B1 | 5/2003 | Bowman-Amuah |
| 6,584,464 B1 | 6/2003 | Warthen |
| 6,507,872 B1 | 7/2003 | Geshwind |
| 6,594,697 B1 | 7/2003 | Praitis et al. |
| 6,601,026 B2 | 7/2003 | Appelt et al. |
| 6,611,535 B2 | 8/2003 | Ljungqvist |
| 6,611,825 B1 | 8/2003 | Billheimer et al. |
| 6,615,172 B1 | 9/2003 | Bennett et al. |
| 6,618,727 B1 | 9/2003 | Wheeler et al. |
| 6,651,220 B1 | 11/2003 | Penteroudakis et al. |
| 6,654,726 B1 | 11/2003 | Hanzek |
| 6,654,815 B1 | 11/2003 | Goss et al. |
| 6,665,662 B1 | 12/2003 | Kirkwood et al. |
| 6,675,159 B1 | 1/2004 | Lin et al. |
| 6,704,728 B1 | 3/2004 | Chang et al. |
| 6,711,561 B1 | 3/2004 | Chang et al. |

(56) References Cited

U.S. PATENT DOCUMENTS

| | | | |
|---|---|---|---|
| 6,714,643 | B1 | 3/2004 | Gargeya et al. |
| 6,714,905 | B1 | 3/2004 | Chang et al. |
| 6,738,759 | B1 | 5/2004 | Wheeler et al. |
| 6,742,015 | B1 | 5/2004 | Bowman-Amuah |
| 6,744,878 | B1 | 6/2004 | Komissarchik et al. |
| 6,745,181 | B1 | 6/2004 | Chang et al. |
| 6,748,387 | B2 | 6/2004 | Garber et al. |
| 6,766,320 | B1 | 7/2004 | Wang et al. |
| 6,785,671 | B1 | 8/2004 | Bailey et al. |
| 6,850,513 | B1 | 2/2005 | Pelissier |
| 6,862,710 | B1 | 3/2005 | Marchisio |
| 6,889,222 | B1* | 5/2005 | Zhao ............... G06F 17/30867 |
| 7,047,242 | B1 | 5/2006 | Ponte |
| 2001/0027463 | A1 | 10/2001 | Kobayashi |
| 2001/0042090 | A1 | 11/2001 | Williams |
| 2001/0047270 | A1* | 11/2001 | Gusick ............... G06Q 30/016 705/1.1 |
| 2001/0056456 | A1 | 12/2001 | Cota-Robles |
| 2002/0032715 | A1 | 3/2002 | Utsumi |
| 2002/0052907 | A1 | 5/2002 | Wakai et al. |
| 2002/0059069 | A1* | 5/2002 | Hsu ............... G10L 15/18 704/257 |
| 2002/0059161 | A1 | 5/2002 | Li |
| 2002/0065953 | A1 | 5/2002 | Alford et al. |
| 2002/0073129 | A1 | 6/2002 | Wang et al. |
| 2002/0078119 | A1 | 6/2002 | Brenner et al. |
| 2002/0078121 | A1 | 6/2002 | Ballantyne |
| 2002/0078257 | A1 | 6/2002 | Nishimura |
| 2002/0083251 | A1 | 6/2002 | Chauvel et al. |
| 2002/0087618 | A1 | 7/2002 | Bohm et al. |
| 2002/0087623 | A1 | 7/2002 | Eatough |
| 2002/0091746 | A1 | 7/2002 | Umberger et al. |
| 2002/0099714 | A1 | 7/2002 | Murray |
| 2002/0103871 | A1 | 8/2002 | Pustejovsky |
| 2002/0107926 | A1 | 8/2002 | Lee |
| 2002/0116463 | A1 | 8/2002 | Hart |
| 2002/0150966 | A1 | 10/2002 | Muraca |
| 2002/0196911 | A1 | 12/2002 | Gao et al. |
| 2003/0004706 | A1* | 1/2003 | Yale ............... G06F 17/27 704/9 |
| 2003/0028564 | A1* | 2/2003 | Sanfilippo ......... G06F 17/30684 715/200 |
| 2003/0046297 | A1 | 3/2003 | Mason |
| 2004/0010491 | A1* | 1/2004 | Riedinger ......... G06F 17/30507 |
| 2004/0064554 | A1* | 4/2004 | Kuno ............... H04L 67/16 709/225 |
| 2004/0167889 | A1 | 8/2004 | Chang et al. |
| 2004/0225653 | A1 | 11/2004 | Nelken et al. |
| 2004/0254904 | A1 | 12/2004 | Nelken et al. |
| 2005/0187913 | A1 | 8/2005 | Nelken et al. |

FOREIGN PATENT DOCUMENTS

| | | |
|---|---|---|
| EP | 0 304 191 | 2/1999 |
| JP | 09106296 | 4/1997 |
| WO | WO 00/36487 | 6/2000 |
| WO | 01/084373 | 8/2001 |
| WO | 01/084374 | 8/2001 |

OTHER PUBLICATIONS

Czerwinski et al, "Visualizing Implicit Queries for Information Management and Retrieval," Proc. of CHI 1999; ACM SIGCHI Conf. on Human Factors in Computing Systems, 1999.
Dumais et al., "Inductive Learning Algorithms and Representations for Task Categorization," Proc. of 7th Intl. Conf. on Information & Knowledge Management, 1998.
Horvitz, "Principles of Mixed-Initiative User Interfaces," Proc. of CHI 1999; ACM SIGCHI Conf. on Human Factors in Computing Systems, 1999.
Horvitz et al., "Display of Information for Time-Critical Decision Making," Proc. of the 11th Conf. on Uncertainty in Artificial Intelligence, Jul. 1995.
Horvitz et al., "The Lumiere Project: Bayesian User Modeling . . . ," Proc. of the 14th Conf. on Uncertainty in Artificial Intelligence, Jul. 1998.
Horvitz et al., "Time-Dependent Utility and Action Under Uncertainty," Proc. of the 7th Conf. on Uncertainty in Artificial Intelligence, Jul. 1991.
Horvitz et al., "Time-Critical Action: Representations and Application," Proc. of the 13th Conf. on Uncertainty in Artificial Intelligence, Jul. 1997.
Koller et al., "Toward Optimal Feature Selection," Proc. of 13th Conf. on Machine Learning, 1996.
Lieberman, "Letizia: An Agent That Assists in Web Browsing," Proc. of International Joint Conference on Artificial Intelligence, 1995.
Platt, "Fast Training of Support Vector Machines Using Sequential Minimal Optimization, Advances in Kernel Methods: Support Vector Learning," MIT Press, Cambridge, MA, 1999.
Platt, "Probabilistic Outputs for Support Vector Machines & Comparisons to Regularized Likelihood Methods," Adv. In Large Margin Classifiers, MIT Press, Cambridge, MA, 1999.
Sahami et al. "A Bayesian Approach to Filtering Junk E-Mail," Amer. Assoc. for Art. Intell. Technical Report WS-98-05, 1998.
Cohen, "Learning Rules that Classify E-Mail," AT&T Laboratories, 1996.
Lewis, "Evaluating and Optimizing Autonomous Text Classification Systems," ACM SIGIR, 1995.
Lewis et al., "Training Algorithms for Linear Text Classifiers," ACM SIGIR, 1996.
Apte et al., "Automated Learning of Decision Rules for Text Categorization," ACM Transactions on Information Systems, vol. 12, No. 3, 1994.
Losee, Jr., "Minimizing Information Overload; The Ranking of Electronic Messages," Journal of Information Science 15, 1989.
Joachimes, "Text Categorization with Support Vector Machines: Learning with Many Relevant Features," Universitat Dortmund, Germany, 1998.
Morelli et al., "Predicting Technical Communication in Product Development Organizations," IEEE Transactions on Engineering Management, vol. 42, Iss. 3, Aug. 1995.
Webster's Third New International Dictionary, G. & C. Merriam Company, 1961, pp. 538, 834, 1460.
Computer Dictionary, Microsoft Press, 1997, Third Edition, p. 192.
Parmentier et al., "Logical Structure Recognition of Scientific Bibliographic References," 4th Int'l Conf. on Document Anlysis & Recognition, vol. 2, Aug. 18-20, 1997.
Kalogeraki et al., "Using Multiple Feedback Loops for Object Profiling, . . . " IEEE Int'l Symposium on Object-Oriented Real-Time Distributed Computing, May 2-5, 1999.
Johnson et al., "Adaptive Model-Based Neural Network Control," IEEE Int'l Conference on Robotics and Automation, May 13-18, 1990.
McKinnon et al., "Data Communications and Management of a Distributed Network of Automated Data Acquisition and Analysis Systems," 1997 IEEE Nuclear Science Symp., Nov. 1997.
Moore et al., "Web Page Categorization and Feature Selection Using Association Rule and Principal Component Clustering," Proceedings of the 7th Workshop on Information Technologies and Systems, Dec. 1997.
Mase, "Experiments on Automatic Web Page Categorization for IR Systems," Technical Report, Stanford University, 1998.
Berners-Lee et al., "The Semantic Web," Scientific American.com, May 17, 2001.
Brasethvik et al., "A Conceptual Modeling Approach to Semantic Document Retrieval," Proceedings of the 14th International Conference on Advanced Information Systems Engineering, May 27-31, 2002.
"Grammar-like Functional Rules for Representing Query Optimization Alternative," 1998 ACM, pp. 18-27.
Khan et al., "Personal Adaptive Web Agent: A Tool for Information Filtering," Canadian Conference on Electrical and Computer Engineering, vol. 1, May 25, 1997, pp. 305-308.

(56) References Cited

OTHER PUBLICATIONS

Davies et al., "Knowledge Discovery and Delivery," British Telecommunications Engineering, London, GB, vol. 17, No. 1, Apr. 1, 1998, pp. 25-35.
Persin, "Document Filtering for Fast Ranking," Sigir 94. Dublin, Jul. 3-6, 1994, Proceedings of the Annual International ACM-Sigir Conference on Research and Development in Information Retrieval, Berlin, Springer, DE, vol. Conf. 17, Jul. 3, 1994, pp. 339-348.
Han et al., "WebACE: A Web Agent for Document Categorization and Exploration," Proceedings of the $2^{nd}$ International Conference on Autonomous Agents Minneapolis/St. Paul, MN, May 9-13, 1998, Proceedings of the International Conference on Autonomous Agents, New York, NY, May 9, 1998, pp. 408-415.
Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.
Firepond eService Provider, http://www.firepond.com/products/eserviceperformer.
Banter White Paper:, "Natural Language Engines or Advanced Customer Interaction," by Banter Inc.
Banter Technology RME, "The Foundation for Quality E-Communications," Technical White Paper.
Webster's Computer Internet Dictionary, $3^{rd}$ Edition, P.E. Margolis, 1999.
searchCRM.com Definitions (contact center), http://www.searchctm.techtarget.com.
"Transforming Your Call Center Into a Contact Center: Where Are You? Trends and Recommendations," An IDC Executive Brief (#33), Jun. 2001.
Hawkins et al., "The Evolution of the Call Center to the 'Customer Contact Center'", ITSC White Paper, Feb. 2001.

\* cited by examiner

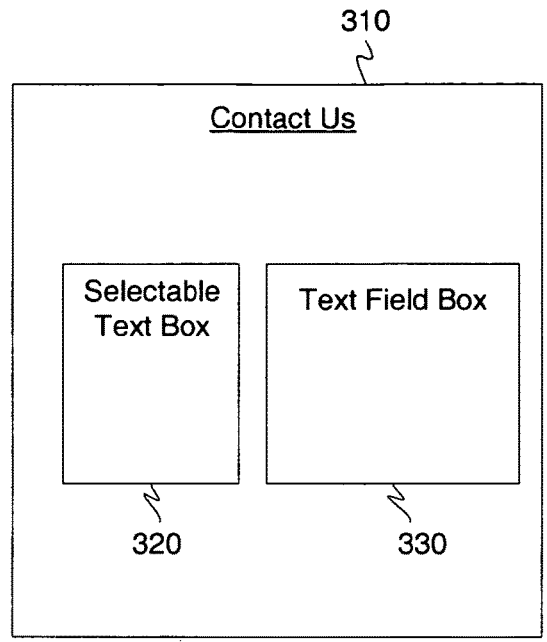
FIG. 3A
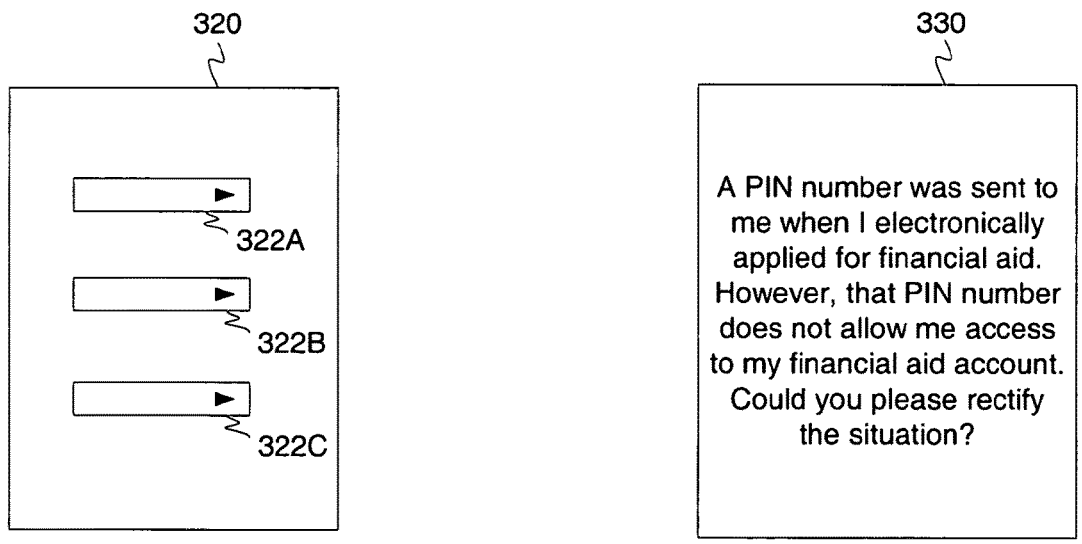
FIG. 3B
FIG. 3C

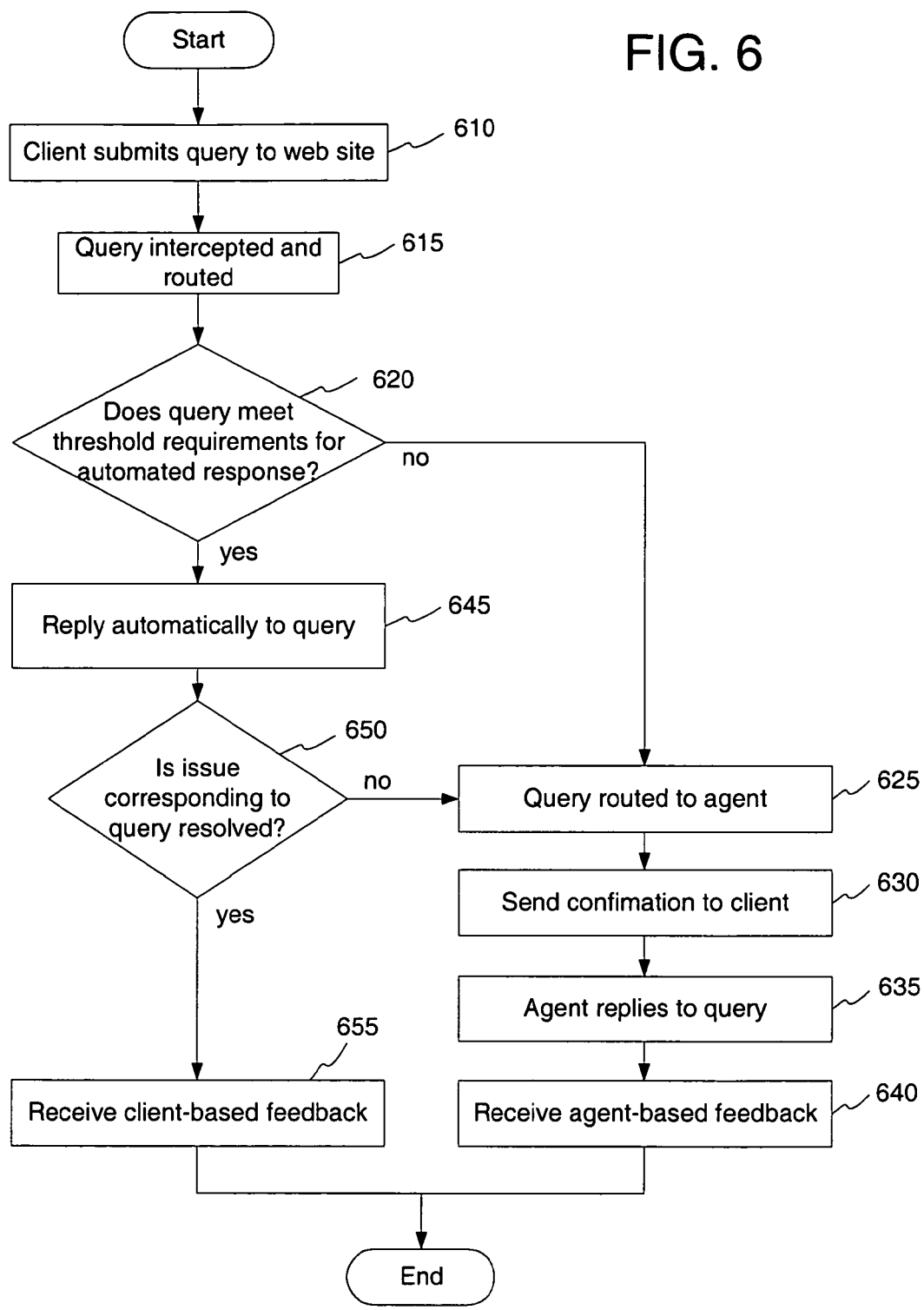

WEB-BASED CUSTOMER SERVICE INTERFACE

CROSS-REFERENCE TO RELATED APPLICATIONS

This application is a continuation of U.S. patent application Ser. No. 11/843,972 entitled "WEB-BASED CUSTOMER SERVICE INTERFACE" filed on Aug. 23, 2007, which is a continuation of U.S. patent application Ser. No. 10/839,930 entitled "WEB-BASED CUSTOMER SERVICE INTERFACE" filed on May 5, 2004, which claims the priority and benefit of U.S. Provisional Patent Application Ser. No. 60/468,576 entitled "Web-Based Customer Service Interface," filed on May 6, 2003, both of which applications are incorporated herein by reference. This application is related to patent application Ser. No. 10/839,829 entitled "System and Method for Electronic Communication Management," filed on May 5, 2004, herein incorporated by reference.

BACKGROUND OF THE INVENTION

1. Field of the Invention

This invention relates generally to electronic communications and relates more particularly to a system and method for a web-based customer service interface.

2. Description of the Background Art

In a typical organization, communications with customers and others may occur via a variety of different channels. In addition to traditional channels such as letters and telephone calls, customers may also communicate with an organization via electronic mail, facsimile, web-based forms, web-based chat, and wireless communication and voice. An organization will most likely incorporate these and any other newly developed communication channels to allow customers to communicate in a way they find most convenient.

Many of the communication channels mentioned above contain information that is unstructured in nature, usually expressed in natural language. Different customers may make identical requests each in a unique way, using different communication channels, different words and expressions, or both. Human agents are usually required to review each natural language communication to evaluate the customer's intent, and to determine what information or action would be responsive to that intent.

Agents typically must look to various sources to gather all of the information required to respond appropriately to a customer communication. The information may be retrieved from a variety of sources, such as legacy systems, databases, back office systems, and front office systems. Each of these sources may store data in a unique structure or format. An agent typically gathers and organizes the required information from one or more of these information sources and uses the information to compose an appropriate content-rich reply that is responsive to the customer's intent.

Utilizing people to respond to customer communications is often inefficient. In addition, an increase in the number of communications received by an organization typically requires an even larger increase in the number of people required to provide an acceptable level of customer service.

Several types of automatic systems exist for responding to customer communications. Rule-based systems, keyword-based systems, and statistical systems typically do not perform with the necessary accuracy to substantially automate business processes, such as responding to customer inquiries, and require a large investment in resources to keep them up-to-date. Many learning systems utilize a training set of data that is a poor representation of the system's world, which reduces the accuracy of the system and makes the process of updating the system very cumbersome.

SUMMARY OF THE INVENTION

The present invention provides a system and method for processing a web-based query. In one embodiment of the invention, the System comprises a web server for transmitting a web form having at least one text field box for entering a natural language query to a client, and a language analysis server for analyzing the natural language query and optional meta-data received from the client to classify the natural language query into at least one predefined category based on information contained within a knowledge base. The web server is further configured to selectively transmit a resource page to the client, where the resource page includes at least one suggested response and optionally other data corresponding to at least one predefined category. In addition, the web server is further configured to receive a communicative action from the client after the resource page is transmitted, wherein the language analysis server may adapt the knowledge base in accordance with the communicative action.

In one embodiment of the invention, the language analysis server classifies the natural language query into predefined categories based on computed match scores, where each match score corresponds to one of the predefined categories. Furthermore, each match score is representative of a confidence level that the natural language query is relevant to a corresponding predefined category. The language analysis server calculates each match score based upon a comparison of concepts extracted from the natural language query to concepts associated with the predefined categories. Each match score is representative of a statistical likelihood of the natural language query being correctly classified to the corresponding predefined category In another embodiment of the invention, the language analysis server routes the natural language query to an agent based upon an analysis of the computed match scores according to a predetermined logic (e.g., if none of the computed match scores meet a predetermined threshold level). In yet another embodiment, the language analysis server transmits a solution page to the client based upon an analysis of the computed match scores according to the predetermined logic (e.g., if at least one match score meets a predetermined high-threshold level).

In accordance with the invention, the method comprises transmitting a web page having at least one user-interactable element for entering a natural language query and optional meta-data to a client, receiving the natural language query and the optional meta-data, analyzing the natural language query to classify the natural language query into at least one predefined category using information contained within a knowledge base, and selectively transmitting a resource page to the client. The resource page includes at least one suggested response and optionally other data corresponding to at least one predefined category.

BRIEF DESCRIPTION OF THE DRAWINGS

FIG. 3A illustrates an exemplary embodiment of a contact-us page, according to the invention;

FIG. 3B illustrates an exemplary embodiment of the drop-down box component illustrated in FIG. 3A, according to one embodiment of the invention;

FIG. 3C illustrates an exemplary embodiment of the text field box illustrated in FIG. 3A, according to one embodiment of the invention;

FIG. 6 illustrates exemplary method steps for processing an electronic query, according to one embodiment of the invention.

DETAILED DESCRIPTION

Figure 1:
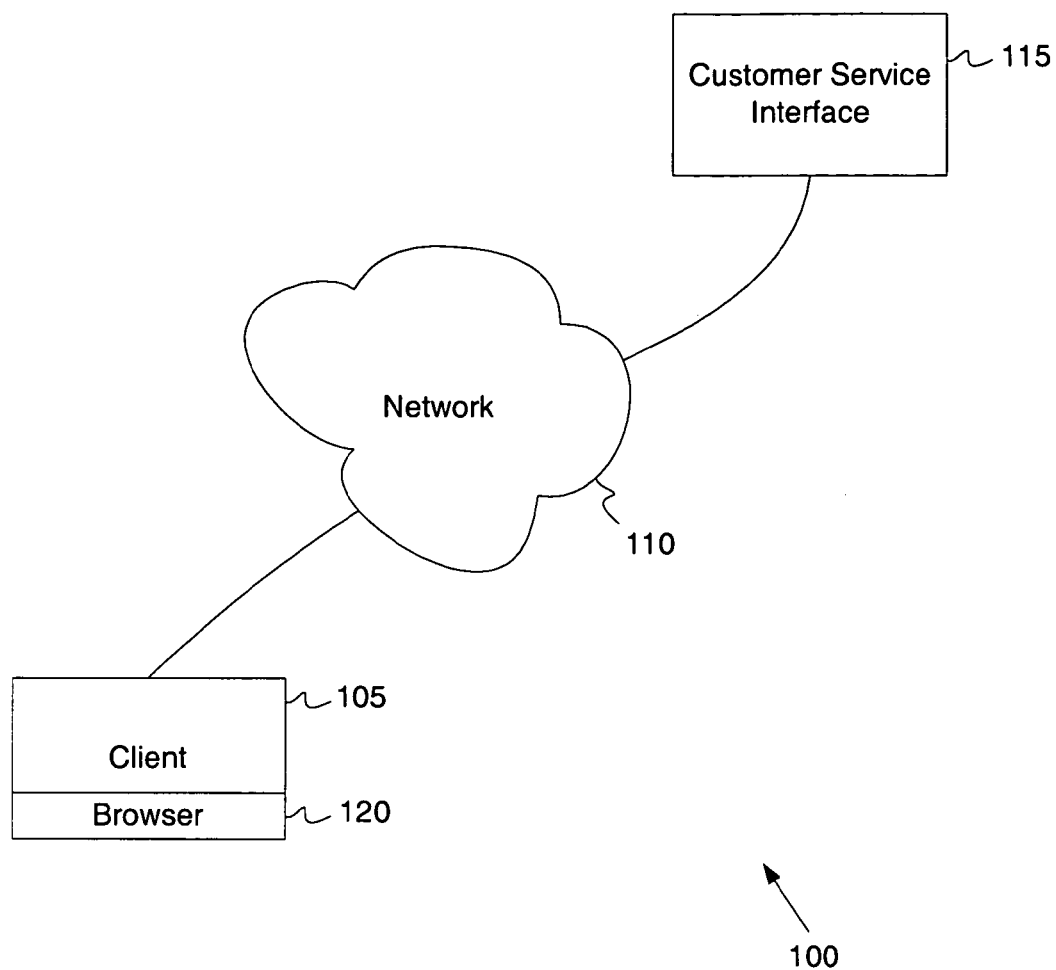
FIG. 1 is an exemplary block diagram of a customer service network for processing an electronic query, according to one embodiment of the invention.

FIG. 1 is an exemplary block diagram of a customer service network 100 for processing an electronic query, according to one embodiment of the present invention. The customer service network 100 comprises a client 105, a network 110 (e.g., the Internet), and a customer service interface 115. The client 105 may comprise a browser 120 for browsing Internet web sites. According to one embodiment of the invention, the customer service interface 115 receives, classifies, and automatically responds to electronic queries submitted by the client 105 via the network 110. The customer service interface 115 is discussed further below in conjunction with FIG. 2.

Figure 2:
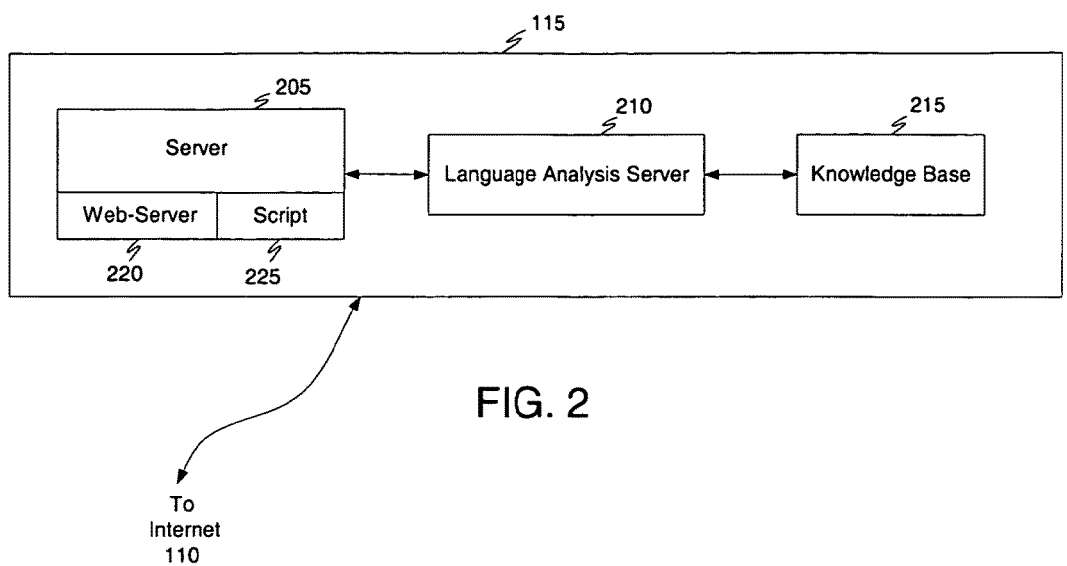
FIG. 2 is an exemplary embodiment of the customer service interface illustrated in FIG. 1, according to one embodiment of the invention.

FIG. 2 is an exemplary embodiment of the customer service interface 115 illustrated in FIG. 1, according to one embodiment of the invention. The customer service interface 115 comprises a server 205, a language analysis server 210, and a knowledge base 215. In an alternate embodiment, the language analysis server 210 and the knowledge base 215 may be integrated in a single module. The server 205 preferably comprises a web-server 220 for providing web services to the client 105 (FIG. 1). For example, the web-server 220 may submit a contact-us page to the client 105. The contact-us page allows a user to address an electronic query to the customer service interface 115, and is discussed further below in conjunction with FIGS. 3A-3C. In addition, the server 205 utilizes a script 225 for processing communications (i.e., queries) from the client 105. The script 205 may be any configurable or non-configurable mechanism for routing information between various components of the customer service interface 115. The communications received by the server 205 contain data or information that is structured and unstructured in nature. For example, the communications typically contain unstructured information expressed in natural language. Each individual client correspondent may compose a communication in a unique way, even when requesting the same type of information from the customer service interface 115. In addition, the communications may contain structured information, such as meta-data associated with the communication, and queries in which the client correspondent selects structured text displayed in drop-down menu boxes. Meta-data may additionally include, for example, information not explicitly provided by the client correspondent, and information regarding client correspondent attributes accessible to the customer service interface 115. In one embodiment of the invention, the script 225 parses the received communications, and sends the parsed information to the language analysis server 210 for further analysis.

The language analysis server 210 analyzes and classifies the electronic query comprising any combination of natural language text, structured text, and structured data (e.g., meta-data) into predefined categories stored in the knowledge base 215, based upon linguistic modeling rules and concepts associated with the predefined categories. In one embodiment, the language analysis server 210 linguistically analyzes the query based upon content and context of the query, and classifies the query to one or more of the predefined categories stored in the knowledge base 215 based upon a match score derived from a statistical comparison of concepts extracted from the query to concepts associated with the one or more predefined categories. In another embodiment, the language analysis server 210 analyzes the query (i.e., extracts concepts from the query) to match the query to the one or more predefined categories using standard search techniques. The language analysis server 210 is discussed further below in conjunction with FIG. 4.

The knowledge base 215 is a branching network of nodes arranged in a vertically structured hierarchy (i.e., tree hierarchy) that represent the various predefined categories. Logically related predefined categories are associated with a branch, which in turn may be associated with a branch of larger scope. Creation of the hierarchies can be either manual (via a configuration tool or an API), automatic by monitoring feedback received via the client 105 or an agent, or a combination, whereby an automatic tool displays suggestions according to performance of the customer service interface 115. A user may then create the hierarchies based upon the suggestions. The knowledge base 215 may also include flat hierarchies as a special case of tree hierarchies. An embodiment of the language analysis server 210 and the knowledge base 215 are discussed in more detail in patent application Ser. No. 10/839,829, entitled, "System and Method for Electronic Communication Management," herein incorporated by reference, filed on an even date herewith.

FIG. 3A illustrates an exemplary embodiment of a contact-us page 310, as composed by the customer service interface 115 (FIG. 2) and transmitted to the client 105 (FIG. 1) via the network 110 (FIG. 1). The contact-us page 310 may include a selectable text box 320 and a text field box 330 for insertion of natural language text. In other embodiments, the contact-us page 310 comprises multiple fields.

FIG. 3B illustrates an exemplary embodiment of the selectable text box 320 illustrated in FIG. 3A, according to one embodiment of the invention. The selectable text box 320 may include a plurality of drop-down boxes 322 that comprise predefined questions or statements, selectable by a user. For example, if the customer service interface 115 services a financial institution, then the drop-down boxes 322 may include statements corresponding to customer service issues such as loans, new accounts, PIN numbers, monetary transfers, among others.

FIG. 3C illustrates an exemplary embodiment of the text field box 330 illustrated in FIG. 3A, according to one embodiment of the invention. The text field box 330 comprises a selectable area in which the user may compose a natural language message to the customer service interface 115. For example, the user may not be able to access an electronic application for financial aid, partially completed and saved on a server of the financial institution during a previous session. The user may compose a message in the text field box 330, comprising, for example, "A PIN number was sent to me when I electronically applied for financial aid. However, that PIN number does not allow me access to my financial aid account. Could you please rectify the situation?" As described in more detail below in conjunction with FIGS. 5-6, the customer service interface 115 classifies and responds to the message, either via a list of suggested responses, a direct link to a "solutions page," or a confirmation page to the client that the query is being routed to an agent for further analysis.

Figure 4:
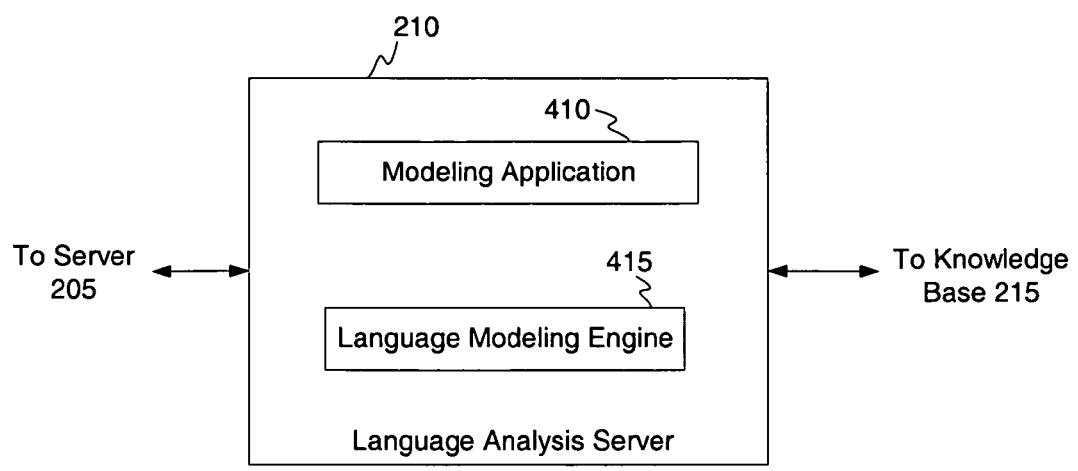
FIG. 4 illustrates one embodiment of the language analysis server illustrated in FIG. 2, according to one embodiment of the invention.

FIG. 4 illustrates one embodiment of the language analysis server 210 as illustrated in FIG. 2, according to one embodiment of the invention. The language analysis server 210 comprises a modeling application 410 and a language modeling engine 415. The modeling application serves as an interface to the server 205 for receiving and transmitting communications. In addition, the modeling application 410 may compare match scores (computed by the language modeling engine 415 in classifying the query to predefined categories) with various predefined threshold scores to determine the nature of the automated response to the client 105. The basis of the automated response to the client's query is discussed below in further detail in association with FIGS. 5-6.

The language modeling engine 415 analyzes and classifies natural language text, structured text, and meta-data into predefined categories stored in the knowledge base 215. For example, the language modeling engine 415 analyzes the text and the meta-data by application of linguistic and morphological models to extract concepts. The language modeling engine 415 then computes match scores based upon a comparison of the extracted concepts with rules and concepts associated with the predefined categories stored in the knowledge base 215. The computation of the match scores and further details of the knowledge base 215 are discussed below in conjunction with FIGS. 5-6.

Figure 5:
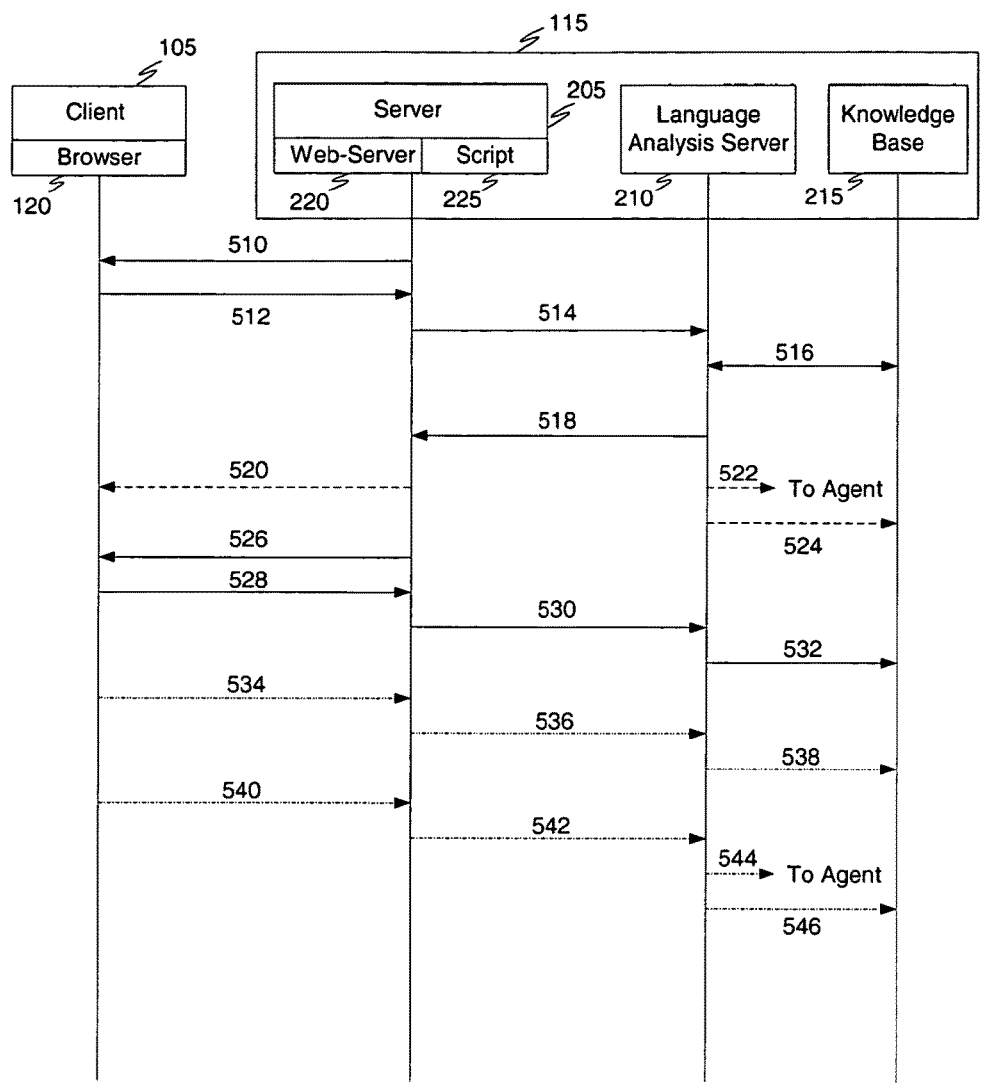
FIG. 5 illustrates an exemplary communication-flow diagram for processing an electronic query as implemented by the customer service network illustrated in FIG. 1, according to one embodiment of the invention.

FIG. 5 is an exemplary communication-flow diagram for processing an electronic query as implemented by the customer service network 100 illustrated in FIG. 1, according to one embodiment of the invention. First, the web-server 220 (FIG. 2) serves a contact-us page 310 (FIG. 3A) to the client 105 (FIG. 1) via a communication 510. The client 105 responds to the contact-us page 310 via a communication 512. For example, the client 105 may respond to the contact-us page 310 (hereinafter referred to as a client query, or simply a query) by selecting specific choices displayed in the drop-down boxes 322 (FIG. 3B), by composing a natural language text in the text field box 330 (FIG. 3C), or both. The web-server 220 receives the client query and routes the query to the script 225 (FIG. 2). The script 225 processes the query, and routes the query to the language analysis server 210 (FIG. 2) via a communication 514.

The language analysis server 210 linguistically and/or morphologically analyzes the query based upon content and context of the query, and classifies the query to one or more of the predefined categories stored in the knowledge base 215 (FIG. 2) via a communication 516. In one embodiment of the invention, the language analysis server 210 classifies the query into the one or more predefined categories based upon a match score derived from a statistical comparison of concepts extracted from the query to concepts associated with the one or more predefined categories. The language analysis server 210 may utilize meta-data in addition to conceptual data extracted from the query to classify the query to the one or more predefined categories. For example, meta-data includes peripheral data not typically associated with content of the query (i.e., with the natural language text and/or drop-down box selections). For example, if the customer service interface 115 (FIG. 2) services a financial institution, then the peripheral data may include user name, user account number, or customer service plan afforded the user. In accordance with a preferred embodiment of the invention, the language analysis server 210 comprises classification techniques as disclosed in patent application Ser. No. 10/839,829, entitled, "System and Method for Electronic Communication Management," herein incorporated by reference, filed on an even date herewith. However, the scope of the present invention covers standard classification techniques well known in the art.

In one embodiment of the invention, the language analysis server 210 computes, for each predefined category, a match score based upon concepts associated with the predefined categories, concepts extracted from the query, and metadata. In an exemplary embodiment of the invention, suppose that the customer service interface 115 services a motorcycle parts and equipment distribution house. Additionally, suppose that the knowledge base 215 has the following three predefined categories: a first predefined category entitled "new parts order," a second predefined category entitled "complaints," and a third predefined category entitled "suggestions." A client correspondent submits to the server 205 a query comprising a natural language text that states, for example, "I am unhappy with the head gasket that you shipped me for my 1955 BMW R50/2. The surface of the replacement gasket is cross-hatched (unlike the original), leading to reduced power and oil leakage. Please either refund my purchase, credit my account or send me the correct gasket." In response to this query, the language analysis server 210 computes a first, a second, and a third match score in classifying the query to the first, the second, and the third predefined categories, respectively, where the second match score is greater than the first match score, and the first match score is greater than the third match score. For example, the second match score may be 95, the first match score may be 42, and the third match score may be 16.

In one embodiment of the invention, each of the predefined categories has a corresponding resource, or linked suggested response in the knowledge base 215, and the relative values of the computed match scores are indicative of a level of confidence of the corresponding suggested responses to answer the query or of the relevancy of the resource to the query. For example, the second match score of 95 (relative to the first and third match scores of 42 and 16, respectively) indicates that the query is more likely to be resolved by the suggested response associated with the second predefined category than the suggested responses associated with the first or third predefined categories.

Next, the language analysis server 210 sends the suggested responses and corresponding match scores to the server 205 via a communication 518. In one embodiment of the invention, the customer service interface 115 is configured to respond to the communication 518 via either a first set of communications (i.e., communications 520, 522, and 524) or a second set of communications initiated by a communication 526, depending upon the corresponding match scores as described below.

If each of the corresponding match scores is less than a predetermined threshold score (where each predefined category may have a different predetermined threshold score), or based upon an analysis of the match scores according to a predetermined logic, then the customer service interface 115 responds via the first set of communications. The predetermined logic includes any functional analysis of the match scores, exemplary embodiments of which include, but are not limited to, computations of an average match score, a median match score, a match score standard deviation, or other types of statistical and/or numerical functional analyses. In an exemplary embodiment of the first set of communications, the server 205 sends a confirmation page to the client 105 via a communication 520. The confirmation page informs the client 105 that the query will be routed to an agent for further analysis. The communication 520 may comprise additional information such as when the client 105 may expect to receive a reply from the agent, for example. In addition, the language analysis server 210 routes the query to the agent for further analysis via a communication 522. The agent may then reply to the client's query, preferably via an electronic message. However the agent may also respond to the query via alternate communication channels, such as a telephone, a Web-based reply, or other means of electronic communication. Optionally, the language analysis server 210 may analyze the agent's reply, and, based upon the analysis, update the knowledge base 215 via a communication 524.

If, however, at least one of the corresponding match scores received by the server 205 via the communication 518 is greater than or equal to the predetermined threshold score (also referred to as a predetermined threshold level), then the customer service interface 115 responds with the communication 526. In one embodiment of the invention, the communication 526 comprises a solution page. The communication 526 comprises a solution page when at least one of the computed match scores has a very high value. Alternatively, the customer service interface 115 may respond with the communication 526 that comprises the solution page based upon an analysis of the match scores according to the predetermined logic as described above. For example, if the customer service interface 115 services a financial institute, a client correspondent may submit a query to the server 205 via the communication 512 that recites, "I want to change my password." If the customer service interface 115 classifies the query to a "change password" predefined category with a high degree of certainty (e.g., the customer service interface 115 classifies the query to the "change password" predefined category with a match score the meets a predetermined high-threshold score), then the server 205 sends the client 105 a "password changing" web page (i.e., the solution page). In another embodiment, the server 205 re-directs the client 105 to the solution page corresponding to the "password changing" web page. The client 105 may then utilize the solution page to resolve the query.

In another embodiment of the invention, the communication 526 may comprise a resource page. For example, the server 205 sends the resource page to the client 105 comprising the suggested responses having corresponding match scores greater than or equal to the predetermined threshold level via the communication 526. The resource page may also comprise other data (such as links to web resources) having corresponding match scores greater than or equal to the predetermined threshold level. In one embodiment of the invention, the client 105 may utilize one of several communicative actions (i.e., communicative actions 528, 534, or 540) to respond to the resource page.

For example, the client 105 may select a suggested response on the resource page, respond to an embedded form on the resource page, or click on a link to a web resource, via a first communicative action 528. The first communicative action 528 is received and processed by the server 205, and the server 205 then routes the processed first communicative action to the language analysis server 210 for linguistic analysis via a communication 530. The language analysis server 210 may optionally update the knowledge base 215 via a communication 532 based upon the linguistic analysis of the first communicative action 528.

Alternatively, the client 105 may respond to the resource page via a second communicative action 534. The second communicative action 534 comprises a non-response to the resource page. More specifically, the client 105 does not respond to the resource page (i.e., the client is non-responsive). For example, in one embodiment of the invention, if the client 105 does not respond to the resource page within a given time limit, or if the client 105 disconnects from the server 205, for example, the second communicative action 534 comprising a non-response is sent to the server 205. The server 205 then sends a communication 536 to the language analysis server 210 indicating the non-response. The language analysis server 210 may update the knowledge base 215 based upon the non-responsiveness of the client 105 via an optional communication 538.

As an additional alternative, the client 105 may respond to the resource page via a third communicative action 540 comprising a communicative escalation. For example, the client 105 may select (e.g., by mouse-clicking) a "request for help" button embedded in the resource page, or request more information regarding a particular suggested response. The server 205 receives the third communicative action 540 comprising the communicative escalation, and routes the communicative escalation to the language analysis server 210 via a communication 542. The language analysis server 210 then sends the communicative escalation to the agent for further analysis via a communication 544. The language analysis server 210 may optionally update the knowledge base 215 based upon the agent's reply to the communicative escalation via a communication 546.

FIG. 6 illustrates exemplary method steps for processing an electronic query, according to one embodiment of the invention. In step 610, the client 105 (FIG. 1) submits an electronic query to a web-site. In one embodiment, the query may be in response to a page served to the client 105 by the web-server 220 (FIG. 2) associated with the web site. The client 105 may be running the browser 120 (FIG. 1) to view the page served by the web-server 220. Next, in step 615, the server 205 (FIG. 2) intercepts and routes the query. For example, the server 205 may run the script 225 (FIG. 2) that processes the query and routes the processed query to the language analysis server 210 (FIG. 2).

In step 620, the language analysis server 210 analyzes the query using the language modeling engine 415 (FIG. 4) and the knowledge base 215 (FIG. 2) to compute match scores and classify the query to predefined categories stored in the knowledge base 215 based upon the match scores, where each predefined category is associated with a suggested response. In one embodiment of the invention, the knowledge base 215 is configured as a rule-oriented/concept-oriented database. For example, the knowledge base 215 may comprise a plurality of nodes configured in a hierarchically structured branching network, where each node is configured as either a rule-oriented or a concept-oriented node. Each concept-oriented node is typically associated with a predefined category. In one embodiment of the invention, the language analysis server 210 utilizes a statistical process to compute the match scores. For example, the language modeling engine 415 analyzes the natural language text of the query to generate concepts associated with the query. The language modeling engine 415 then statistically compares the query-derived concepts with rules associated with the rule-oriented nodes and with concepts associated with the concept-oriented nodes stored in the knowledge base 215. The language modeling engine 415 then computes a match score for one or more concept-oriented nodes (i.e., for one or more predefined categories). In one embodiment, a high match score for a particular predefined category indicates that a suggested response corresponding to the predefined category is more likely to be a correct response than a suggested response corresponding to a predefined category with a low match score. Based upon the computed match scores, the modeling application 410 (FIG. 4) determines if the query meets any of the predetermined threshold levels for an automated response.

For example, if each match score associated with each predefined category is less than a corresponding predetermined threshold level, then in step 625, the modeling application 410 routes the query to an agent for further analysis. Preferably, the agent is a human agent. However, in alternate embodiments, the agent may be an automated service, such as an automated phone service or an automated computer system. Next, in step 630, the server 205 sends the client 105 a confirmation page. In one embodiment, the confirmation page comprises a communication confirming that the client's query is being routed to the agent for further analysis. Next, in step 635, the agent replies to the query. In one embodiment of the invention, the agent replies to the client 105 via an electronic mail system. However, the scope of the present invention covers alternate agent-reply methods, such as web-based, telephonic, or facsimile methods.

Next, in optional step 640, the language analysis server 210 processes the agent's reply to the client to generate agent-based feedback. The language analysis server 210 may then update the knowledge base 215 based upon the agent-based feedback. The agent-based feedback may comprise positive or negative feedback. The language analysis server 210 uses the feedback to modify the knowledge base. For example, the language analysis server 210 may modify concepts, add new concepts, eliminate concepts, or modify weights assigned to different concepts associated with concept-oriented nodes. The language analysis server 210 may also modify relationships between nodes, such as structural relationships defined by branching structures, for example. In alternate embodiments, the language analysis server 210 may modify classification rules associated with rule-oriented nodes stored in the knowledge base 215.

Referring back to step 620, if at least one match score associated with at least one predefined category is greater than or equal to a corresponding predetermined threshold level, then in step 645, the server 205 submits a resource page to the client 105. The resource page may comprise a suggested response page, where each suggested response corresponds to a predefined category with an associated match score greater than or equal to the corresponding threshold level. A suggested response may include a message that recites, for example, "no response was found." Alternatively, if an associated match score is greater than or equal to a corresponding high-threshold level, then the resource page comprises a solution page that provides either a link or a web page to the client 105 that may directly resolve the query. Each predefined category may have different threshold levels and high-threshold levels. Next, in step 650, the client 105 responds to the resource page and the server 205 determines whether the client query is resolved based upon the client response. In one embodiment of the invention, the query is not resolved if the client 105 escalates (e.g., the client 105 responds with a request for help), and the process then continues at step 625.

However, if in step 650 the query is resolved, then in optional step 655, the language analysis server 210 receives client-based feedback (i.e., feedback based upon the client's response). In one embodiment of the invention, the query is considered resolved if the client 105 selects a suggested response, or if the client 105 does not select any response (i.e., the client 105 is non-responsive).

In optional step 655, the language analysis server 210 updates the knowledge base 215 based upon the client-based feedback. For example, a selection of a suggested response corresponding to a high match score generates a positive client-based feedback that may strengthen the concept-oriented nodes of the knowledge base 215 that generated the suggested responses. In one embodiment of the invention, a concept-oriented node may be strengthened by redistributing weights assigned to concepts associated with the node. However, if the client 105 selects a suggested response corresponding to a low match score, then the client 105 generates negative client-based feedback that may modify the concept-oriented nodes and branching structures that generated the selected suggested response.

The present invention has been described above with reference to exemplary embodiments. Other embodiments will be apparent to those skilled in the art in light of this disclosure. The present invention may readily be implemented using configurations other than those described in the exemplary embodiments above. Therefore, these and other variations upon the exemplary embodiments are covered by the present invention.

The invention claimed is:

1. A method for processing an electronic query, comprising:
   receiving an electronic query from a client computer at a server computer, wherein the server computer is configured for:
   analyzing the query using a language modeling engine and a knowledge base to compute match scores and to classify the query into one or more predefined categories stored in the knowledge base based upon the match scores, wherein each of the predefined categories is associated with a suggested response;
   wherein the language modeling engine analyzes a natural language text of the query to generate concepts associated with the query, statistically compares the concepts with rules associated with the rule-oriented nodes and with concepts associated with the concept-oriented nodes stored in the knowledge base, and computes the match scores for one or more concept-oriented nodes representing one or more of the predefined categories;
   determining if the query meets any of one or more predetermined threshold levels for an automated response, based upon the match scores;
   transmitting a suggested response page to the client computer, if the query does meet any of the predetermined threshold levels for the automated response, wherein the suggested response page includes the suggested response associated with each of the predefined categories with an associated match score greater than or equal to a corresponding one of the predetermined threshold levels;
   otherwise routing the query to an agent for further analysis, if the query does not meet any of the predetermined threshold levels for the automated response, wherein the client computer is sent a confirmation page confirming that the query is being routed to the agent for further analysis, and the agent subsequently replies to the query; and wherein a language analysis server processes the agent's reply to the client computer to generate agent-based feedback, and the language analysis server updates the knowledge base based upon the agent-based feedback;

wherein the language analysis server modifies concepts, adds new concepts, eliminates concepts, or modifies weights assigned to different concepts associated with concept-oriented nodes stored in the knowledge base, based upon the agent-based feedback; and wherein the query is considered resolved, if the client computer selects a suggested response or if the client computer does not select any response;

receiving client-based feedback, in response to the query being resolved, for use in updating the knowledge base, wherein:

if the client computer selects a suggested response corresponding to a high match score, then the client computer generates a positive client-based feedback for use in updating the knowledge base, and if the client computer selects a suggested response corresponding to a low match score, then the client computer generates a negative client-based feedback for use in updating the knowledge base.

2. The method of claim 1, wherein the knowledge base comprises a plurality of nodes configured in a hierarchically structured branching network, each node is configured as either a rule-oriented or a concept-oriented node, and each concept-oriented node is associated with a predefined category.

3. The method of claim 1, wherein a high match score for a predefined category indicates that a suggested response corresponding to the predefined category is more likely to be a correct response than a suggested response corresponding to a predefined category with a low match score.

4. The method of claim 1, wherein the agent is a human agent.

5. The method of claim 1, wherein the agent is an automated service.

6. The method of claim 1, wherein the language analysis server modifies relationships between nodes stored in the knowledge base, based upon the agent-based feedback.

7. The method of claim 1, wherein the language analysis server modifies classification rules associated with rule-oriented nodes stored in the knowledge base, based upon the agent-based feedback.

8. The method of claim 1, wherein the suggested response includes a message that recites "no response was found".

9. The method of claim 1, wherein, if the associated match score is greater than or equal to a corresponding high-threshold level, then the suggested response page comprises a solution page that provides either a link or a web page to the client computer that resolves the query.

10. The method of claim 1, wherein the client computer responds to the suggested response page and the server determines whether the query is resolved based upon the client response.

11. The method of claim 1, wherein the query is not resolved if the client computer escalates.

12. The method of claim 1, wherein, if the query is resolved, then a language analysis server receives the client-based feedback, and the language analysis server updates the knowledge base based upon the client-based feedback.

13. The method of claim 12, wherein the positive client-based feedback strengthens a concept-oriented node stored in the knowledge base that generated the suggested response.

14. The method of claim 13, wherein the concept-oriented node is strengthened by redistributing weights assigned to concepts associated with the concept-oriented node.

15. The method of claim 12, wherein the negative client-based feedback modifies a concept-oriented node and branching structures stored in the knowledge base that generated the suggested response.

16. A system for processing an electronic query, comprising:

a server computer for receiving an electronic query from a client computer, wherein the server computer is configured for:

analyzing the query using a language modeling engine and a knowledge base to compute match scores and to classify the query into one or more predefined categories stored in the knowledge base based upon the match scores, wherein each of the predefined categories is associated with a suggested response;

wherein the language modeling engine analyzes a natural language text of the query to generate concepts associated with the query, statistically compares the concepts with rules associated with the rule-oriented nodes and with concepts associated with the concept-oriented nodes stored in the knowledge base, and computes the match scores for one or more concept-oriented nodes representing one or more of the predefined categories;

determining if the query meets any of one or more predetermined threshold levels for an automated response, based upon the match scores;

transmitting a suggested response page to the client computer, if the query does meet any of the predetermined threshold levels for the automated response, wherein the suggested response page includes the suggested response associated with each of the predefined categories with an associated match score greater than or equal to a corresponding one of the predetermined threshold levels;

otherwise routing the query to an agent for further analysis, if the query does not meet any of the predetermined threshold levels for the automated response, wherein the client computer is sent a confirmation page confirming that the query is being routed to the agent for further analysis, and the agent subsequently replies to the query; and wherein a language analysis server processes the agent's reply to the client computer to generate agent-based feedback, and the language analysis server updates the knowledge base based upon the agent-based feedback;

wherein the language analysis server modifies concepts, adds new concepts, eliminates concepts, or modifies weights assigned to different concepts associated with concept-oriented nodes stored in the knowledge base, based upon the agent-based feedback; and wherein the query is considered resolved, if the client computer selects a suggested response or if the client computer does not select any response;

receiving client-based feedback, in response to the query being resolved, for use in updating the knowledge base, wherein:

if the client computer selects a suggested response corresponding to a high match score, then the client computer generates a positive client-based feedback for use in updating the knowledge base, and if the client computer selects a suggested response cor-
responding to a low match score, then the client computer generates a negative client-based feedback for use in updating the knowledge base.

\* \* \* \* \*